US011978324B2

(12) United States Patent
Eytchison et al.

(10) Patent No.: US 11,978,324 B2
(45) Date of Patent: May 7, 2024

(54) UPGRADE SYMBOL COLLECTION FOR SKILL-BASED GAMES IN A GAMING SYSTEM

(71) Applicant: IGT, Las Vegas, NV (US)

(72) Inventors: Jonathan Eytchison, Reno, NV (US); David Houry, Reno, NV (US); Harvey Duenas, Reno, NV (US)

(73) Assignee: IGT, Las Vegas, NV (US)

( * ) Notice: Subject to any disclaimer, the term of this patent is extended or adjusted under 35 U.S.C. 154(b) by 281 days.

(21) Appl. No.: 16/993,537

(22) Filed: Aug. 14, 2020

(65) Prior Publication Data

US 2021/0027585 A1 Jan. 28, 2021

Related U.S. Application Data

(63) Continuation of application No. 15/846,426, filed on Dec. 19, 2017, now abandoned.

(51) Int. Cl.
*A63F 13/00* (2014.01)
*G07F 17/32* (2006.01)
*G07F 17/34* (2006.01)

(52) U.S. Cl.
CPC ...... *G07F 17/3295* (2013.01); *G07F 17/3213* (2013.01); *G07F 17/3244* (2013.01); *G07F 17/3267* (2013.01); *G07F 17/3293* (2013.01); *G07F 17/34* (2013.01)

(58) Field of Classification Search
CPC ......................... G07F 17/3267; G07F 17/3295
See application file for complete search history.

(56) References Cited

U.S. PATENT DOCUMENTS

| | | | | |
|---|---|---|---|---|
| 9,558,632 | B2 * | 1/2017 | Melnick | G07F 17/3213 |
| 2009/0286592 | A1 * | 11/2009 | Vann | G07F 17/34 463/20 |
| 2012/0115581 | A1 * | 5/2012 | Englman | G07F 17/34 463/25 |
| 2013/0079088 | A1 | 3/2013 | Lafky et al. | |
| 2019/0188973 | A1 | 6/2019 | Eytchison et al. | |

OTHER PUBLICATIONS

Official Action for U.S. Appl. No. 15/846,426, dated Oct. 31, 2019 7 pages.
Official Action for U.S. Appl. No. 15/846,426, dated May 15, 2020 8 pages.
Official Action for Australia Patent Application No. 2018267658, dated Jun. 24, 2022 3 pages.

* cited by examiner

*Primary Examiner* — David L Lewis
*Assistant Examiner* — Eric M Thomas
(74) *Attorney, Agent, or Firm* — Sheridan Ross P.C.

(57) ABSTRACT

Technology for providing bonus symbol collection for skill-based games in a gaming system is disclosed. An electronic gaming machine (EGM) may collect one or more upgrade symbols generated from an outcome of a primary game funded by one or more wagers such that the one or more upgrade symbols are categorized according to a type of symbol for use in a skill-based bonus game. The skill-based bonus game may be accessed according to the one or more primary game outcomes. One or more upgrade symbols may be used to enhance player performance of one or more quantifiable skill-based inputs during the skill-based bonus game.

20 Claims, 10 Drawing Sheets

UPGRADE SYMBOL COLLECTION FOR SKILL-BASED GAMES IN A GAMING SYSTEM

BACKGROUND

The present disclosure relates in general to gaming devices and systems, and more particularly to upgrade symbol collection in a primary game for use in one or more skill-based games in a gaming system.

Games of chance have been enjoyed by people for many years and have undergone increased and widespread popularity in recent times. As with most forms of entertainment, some players enjoy playing a single favorite game, while others prefer playing a wide variety of games. In response to the diverse range of player preferences, gaming establishments commonly offer many types of electronic games. Many electronic gaming machines (EGMs), such as slot machines and video poker machines, have been a cornerstone of the gaming industry for several years. The EGMs include specially programmed computers and contain multiple external interfaces. Further, the EGMs each provide various gaming functionality (i.e., differing games), which each have unique attributes to enhance player enjoyment.

BRIEF SUMMARY

Various embodiments are disclosed for upgrade symbol collection in a primary game for use in one or more skill-based games in a gaming system. An electronic gaming machine (EGM) may collect one or more upgrade symbols generated from an outcome of a primary game funded by one or more wagers such that the one or more upgrade symbols are categorized according to a type of symbol for use in a skill-based bonus game. The skill-based bonus game may be accessed according to the one or more primary game outcomes. The one or more upgrade symbols may be used to enhance player performance of one or more quantifiable skill-based inputs during the skill-based bonus game.

The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Aspects of the present disclosure are illustrated by way of example and are not limited by the accompanying drawings.

DETAILED DESCRIPTION OF THE DRAWINGS

Figure 1:
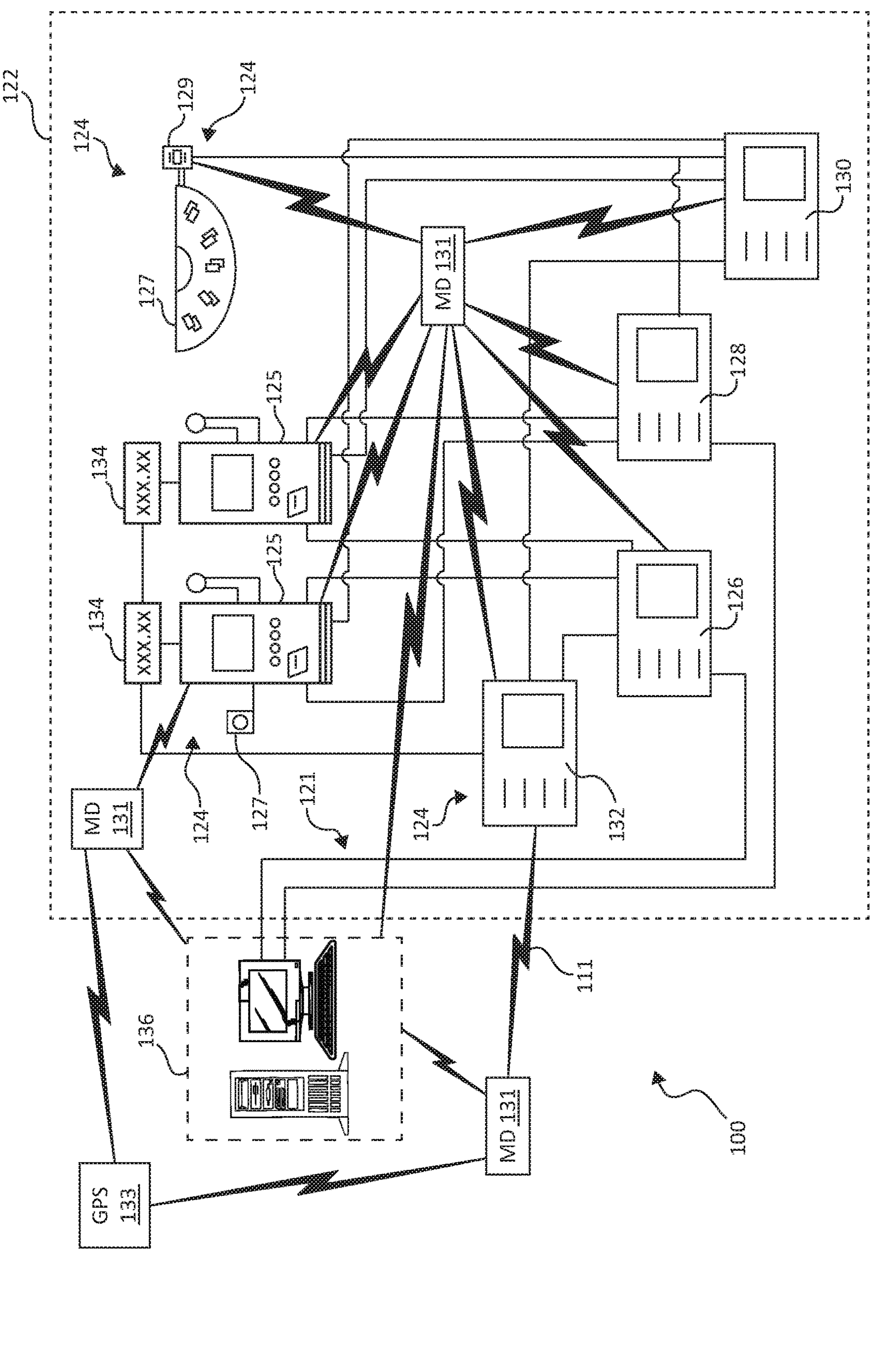
FIG. 1 is a block diagram illustrating a gaming system environment with a gaming terminal data repository (GTDR) connected via one or more network interface(s) to a gaming network which, for example, may include gaming devices (e.g., gaming terminals)

In general, gaming machines, such as electronic gaming machines (EGMs), require a player to place or make a wager to activate a primary or base game. The award may be based on the player obtaining a winning symbol or symbol combination and on the amount of the wager (e.g., the higher the wager, the higher the award). Symbols or symbol combinations that are less likely to occur usually provide higher awards. In such gaming machines, the amount of the wager made on the base game by the player may vary. For instance, a gaming machine may allow the player to wager a minimum number of credits, such as one credit (e.g., one penny, nickel, dime, quarter or dollar) up to a maximum number of credits, such as five credits. The player may make this wager a single time or multiple times in a single play of a primary game. For instance, a slot game may have one or more pay lines and the slot game may allow the player to make a wager on each pay line in a single play of the primary game. Slot games with 1, 3, 5, 9, 15 and 25 lines may be provided. Thus, a gaming machine, such as one providing a slot game, may allow players to make wagers of substantially different amounts on each play of the primary or base game ranging, for example, from one credit up to 125 credits (e.g., five credits on each of 25 separate pay lines). This principle holds true for other wagering games, such as video draw poker, where players may wager one or more credits on each hand and where multiple hands may be played simultaneously. Of course, different players play at substantially different wagering amounts or levels and at substantially different rates of play.

Secondary or bonus games may also be provided in the gaming machines, where the secondary or bonus games may provide an additional award to the player. Secondary or bonus games may or may not require an additional wager by the player to be activated, and may be activated or triggered upon an occurrence of a designated triggering symbol or triggering symbol combination in the primary or base game. For instance, a bonus symbol occurring on the pay line on the third reel of a three-reel slot machine may trigger the secondary bonus game. When a secondary or bonus game is triggered, the gaming machine may indicate this to the player through one or more visual and/or audio output devices, such as the reels, lights, display units, speakers, video screens, etc. thereof. Part of the enjoyment and excitement of playing certain gaming machines is the occurrence of these secondary or bonus games (even prior to the player being aware of what the bonus award will be). In other words, obtaining a bonus award is part of the enjoyment and excitement for players.

Progressive awards may also be provided in gaming machines. A progressive award may be an award amount that includes an initial amount funded by a casino and an additional amount funded through a portion of each wager made on the progressive gaming machine. For example, 1% to 5% of each wager placed on the primary game of the gaming machine associated with the progressive award may be allocated to the progressive award or progressive award fund. The progressive award grows in value as more players play the gaming machine, and thus, portions of these players' wagers are allocated to the progressive award. When a player obtains a winning symbol or symbol combination, which is associated with and therefore results in winning the progressive award, the accumulated progressive award is provided to the player. After the progressive award is provided to the player, the amount of the next progressive award may be reset to an initial value, a predetermined value, or randomly generated value, and a portion of each subsequent wager on a gaming machine associated with the progressive award is allocated to the next progressive award as described above.

A progressive award may be associated with a single gaming machine or multiple gaming machines which each contribute portions of the progressive award. The multiple gaming machines may be in the same bank of machines, in the same casino or gaming establishment (usually through a local area network ("LAN")) or in two or more different casinos or gaming establishments (usually through a wide area network ("WAN")). Such progressive awards are sometimes called local area progressive ("LAP") and wide area progressive ("WAP"), respectively. Progressive awards may increment through communication between a progressive controller and one or more gaming machines. The gaming machines associated with the progressive award transfer coin-in information to a progressive controller. From this information, the progressive controller calculates how much to increment the progressive award based on a set increment rate and then increments the progressive award accordingly. The gaming machines may provide the player a choice between different wager levels prior to the commencement of a primary game. The different wager levels enable the player to win different progressive awards. The gaming devices provide a progressive award (i.e., jackpot) where the value of the jackpot may increase by a particular amount for every game played. Thus, when multiple gaming devices are linked together to form one large progressive jackpot, the jackpot grows more quickly because multiple players are contributing to the jackpot at the same time.

With this in mind, various aspects of the present technology provide for enabling a player to play one or more primary games (e.g., a base slot game) in which one or more upgrade symbols within the primary game may be collected that subsequently unlock an upgrade feature or award that the player will then utilize in a skill-based bonus game (i.e., a secondary game). The functionality disclosed herein provides additional benefits and features over the current state of the art by linking a primary game/base game with bonus games/skill-based games (secondary games). This technology addresses a current challenge of appealing to and reaching players that are attracted to a skill-based gaming machine, and whom may be less interested in a slot-based game. Linking a primary slot-based game with a skill-based game according to collected bonus symbols that unlocks an upgrade feature/award maintains the interest of a player in the base game while simultaneously building anticipation for the bonus game. This is because, for example, each spin in the base game provides the player an opportunity or chance that their bonus game experience will be enhanced. Furthermore, the disclosed functionality provides gaming institutions with a competitive advantage by increasing player retention through the satisfaction and enjoyment of combining the primary slot-based game(s) with the secondary skill-based bonus game(s) and their associated rewards.

In an additional aspect, the present technology provides bonus symbol collection for skill-based games in a gaming system. An EGM may collect the one or more upgrade symbols generated from an outcome of a primary game funded by the one or more wagers such that the one or more upgrade symbols are categorized according to a type of symbol for use in the skill-based bonus game. In one form, an upgrade symbol may enable (or enable additional) performance of a player playing the skill-based game. In another form, the upgrade symbol may enable additional "protection" from opposing forces in the skill-based game. In other words, one or more classifications or categories related to various aspects of difficulty and/or duration of the secondary game may be defined for the upgrade symbol(s) that may be used in the skill-based game.

Each category may have various features and benefits for playing the skill-based game. For example, if playing the secondary (skill-based) game were to include piloting a spacecraft where the objective is to avoid "missile strikes" from the player's opposition, an upgrade symbol may be classified as a "shield" whereby the spacecraft may be protected by a defined number of opposing attacks (e.g., the upgrade symbol enables the spacecraft to be struck by 10 times as many opposing missiles as the spacecraft would otherwise bear prior to the spacecraft being "destroyed", and the game thus ending). Another example may include the upgrade symbol comprising the addition of a rocket to the spacecraft which enables the spacecraft to increase speed in the skill-based game by a defined amount (e.g., a speed increase of 2 times, 4 times, or the like).

In one embodiment, a particular player's skill may be determined and quantified by one or more inputs by the player, or the skill may be determined by registering no inputs at all (zero input). These determined and quantified inputs tend to measure one or more aspects of the player's skill. It should be appreciated that for purposes of this description, skill includes: (i) physical skill (i.e., timing, aim, physical strength or any combination thereof) which is quantifiable by zero, one, or more inputs made by the player in association with the skill-based game; (ii) mental skill (i.e., knowledge, reasoning, and/or strategy) which is quantifiable by zero, one, or more inputs made by the player in association with the skill-based game; and/or (iii) any other type of skill which is quantifiable by zero, one, or more inputs made by the player in association with the skill-based game.

In various embodiments, the player utilizes one or more skill input devices to make one or more quantifiable skill inputs. Examples of skill input devices include, but are not limited to: joysticks, buttons, a mouse or a plurality of mice, one or more trackballs, one or more pointing devices, one or more bodily motion tracking devices (e.g., motion sensing devices for human-computer interaction), touchpads, touchscreens, one or more controllers with: (1) one or more motion sensing devices, (2) one or more proximity sensing devices, (3) one or more force sensing devices (transducers), (4) one or more accelerometers, or any other suitable skill input devices known or commonly used in the art.

By making the one or more quantifiable skill inputs, the player manipulates, influences or otherwise controls one or more aspects of the skill-based game (and thus influences or otherwise affects an outcome of the skill-based game). In certain embodiments, different quantifiable skill inputs by the player influence a different event or a different sequence of events which occur in association with the play of the skill-based game. That is, a first quantifiable skill input or type of quantifiable skill input) by the player results in a first outcome, a first series of outcomes, a first event or a first sequence of events, while a second, different, quantifiable skill input (or type of quantifiable skill input) by the player results in a second outcome, a second series of outcomes, a second event or a second sequence of events.

As aforementioned, in some embodiments, the skill-based bonus game may be accessed according to the one or more primary game outcomes, and the one or more upgrade symbols may be used to enhance player performance of one or more quantifiable skill-based inputs during the skill-based bonus game. In one aspect, the EGM may be in communication with a Personal Electronic Device (PED), which also may be referred to herein as a "mobile device" (e.g., a smartphone or tablet). The PED may be used to play the primary game and/or the skill-based game according to user preferences, the EGM providing the primary and/or skill-based game, the type of primary game, the type of skill-based game, or a combination thereof.

The PED may also comprise a financial transaction device that enables the PED to provide monetary transfers to and/or from the EGM, the PED, a gaming establishment account and/or a financial institution, or some combination thereof. The PED may use a variety of communication protocols such as near field communication (NFC), Bluetooth, and/or other wireless communications to facilitate the monetary transfer to and from the EGM. The funds of a player may be transferred from any type of financial institution (e.g., a bank) to a player wagering account of one or more gaming venues, and the funds of the player may additionally be stored or represented on the PED or EGM as a virtual ticket. In one embodiment, the wireless communication may connect directly to the processing unit on a particular and identified EGM, and the EGM may be configured with a software and/or hardware device that communicates with the PED. The EGJ\;I may contain a device that communicates with a payment acceptor (e.g., a bill acceptor or printer) to accept and/or simulate bills and tickets. Further, the EGM may have a device (software and/or hardware) that communicates with a back-end host that ultimately uses a slot account system (SAS) or game-to-system (G2S) to transfer the player's funds to and from the particular and identified EGM. This configuration allows all EGMs to be retrofitted for mobile payments.

In other words, when an actual wireless mobile payment transfer occurs via a PED, money may be electronically (virtually) moved from the EGM to the financial institution and/or PED or vice versa. This funding may be moved to and from a player account and/or to an alternate account stored on the PED, such as a virtual ticket stored on the PED. The transfer process may include a unique PED identifier (ID), which may comprise a selected identifier, a player's account ID associated with a player's loyalty account, and/or a media access control (MAC) address. In this way, the PED may be always identified as the authorized player's PED. In one embodiment, the player may cash out to the player's PED, player's account, and/or financial institution. The electronic transfer of the mobile payments and/or gaming credits between the PED and EGM may provide the unique PED ID and other associated details, such as, for example, date, time, transfer amount, property, EGM information, biometric information, digital signature, key codes, and the like. Moreover, the unique PED ID may include and be associated with a player's account information, the EGM, geolocation information of the EGM (e.g., the physical location of the EGM in a gaming venue), serial numbers of the EGM, geolocation information of the PED, banking account information, information regarding a bank level/bank of EGMs, and/or other verifiable data relating to the EGM. Thus, the unique PED ID may be virtually created, stored in a virtual network environment, and maintained in the virtual network environment associated with the gaming venue for binding mobile transfers of mobile payments between a PED and the EGM.

Turning now to FIG. 1, a block diagram illustrating a gaming system environment 100 is shown. Environment 100 includes a Gaming Terminal Data Repository (GTDR) connected via one or more network interface(s) to a gaming network which, for example, may include gaming devices (e.g., gaming terminals) and/or other devices, in which aspects of the present disclosure may be realized. As illustrated in FIG. 1, the gaming environment 100 may comprise a gaming system/environment 122 located in a physical environment (not shown). It will be appreciated that the communication links between the various components may be separate and distinct or may be commonly used. It will also be appreciated that one or more of the functions or applications described above may be consolidated, such as at a common server or host. Further, other components for implementing other functionality may be provided. For example, a variety of computing devices, such as user stations, may be connected to the various systems. Printers and other peripheral devices may also be connected to each network or system. A gaming system/environment 122 may be located at least partially in one or more physical gaming environments, such as a casino, restaurant, and/or convenience store. For example, the casino may include publicly accessible game areas where certain of the gaming system devices 124, such as gaming machines 125 (i.e., EGM) and table games 127 are located, as well as secure areas where the servers and other components are located.

In one embodiment, the physical environment includes at least a portion of a physical structure, such as a casino, housing one or more components of the gaming system/environment 122. The gaming system/environment 122 includes one or more gaming system devices 124 or components. The gaming system devices 124 may include gaming machines 125, such as those known as video or slot machines. The gaming system devices 124 may also include "table" games 127 such as Blackjack and Roulette. The gaming system devices 124 may also include components or devices such as player tracking card readers 129, coin counters and other gaming device functionality options, which devices or components may be linked or associated with other devices. The devices or components may also comprise computers or servers and communication equipment, cashier and accounting workstations, and a wide variety of other elements.

In one embodiment, the gaming system/environment 122 may include a variety of sub-systems. These sub-systems may be partially or fully independent of one another or may be related. In one embodiment, each system may be included or be part of a network. In one embodiment, the gaming system/environment 122 may include a game presentation/operation system, which includes at least one game server 126. The game server 126 may comprise a computing device including a processor and a memory. The game server 126 may be adapted to perform a variety of functions. This functionality may be implemented by software and/or hardware of the game server 126. In one embodiment, the game server 126 may be arranged to provide information or instructions to the one or more gaming system devices 124 or individual gaming system components. The information may comprise game code and control data. In one embodiment, the game server 126 may also be arranged to accept information from the gaming system devices 124 or components. For example, the game server 126 may accept information regarding the status of operation of a particular gaming system device 124 (such as "normal" or "malfunction").

In one embodiment, the game server 126 is part of a network, which includes a communication link between the game server 126 and selected gaming system device(s) 124 and/or other component(s) with which communication is desired. A communication interface may be associated with the game server 126 and each device or component for facilitating the communication. The communication interfaces may have a variety of architectures and utilize a variety of protocols such as IEEE-1394 (Fire Wire™) or Ethernet in the case where the communication link is a wired link, or a wireless link utilizing a wireless protocol such as WIFI, Bluetooth™, Radio Frequency (RF), Infrared, etc. The communication links may transmit electrical, electromagnetic or optical signals, which carry digital data streams, or analog signals representing various types of information. In one embodiment, such as when the gaming system device 124 comprises a gaming machine 125, the gaming system device 124 may include a master gaming controller, which controls the functions of game operation. The communication interface may be associated with the master gaming controller, permitting data to be transmitted between the game server 126 and the master gaming controller.

In one embodiment, the gaming system/environment 122 may include a player tracking system, which includes at least one player-tracking server 128. The player-tracking server 128 may also comprise a computing device including a processor and a memory. The player-tracking server 128 may be adapted to perform player-tracking functions. For example, the player-tracking server 128 may store information regarding the identities of players and information regarding the game play of those players. This information may include time of play, coin in/coin out or other monetary transaction data, and (in an arrangement where players are awarded points based on play) a player's point total. Once again, the player tracking system includes a network comprising a communication link provided between the player-tracking server 128 and one or more of the gaming system devices 124 having a player-tracking function or other components of the gaming system/environment 122 associated with the system. In one embodiment, such as where the gaming system device 124 comprises a gaming machine, the device may include a management interface board, which controls a card reader. The management interface board may be arranged to receive data from the master gaming controller of the gaming system device 124. A communication interface is associated with the management interface board, permitting data to be transmitted between the player-tracking server 128 and the management interface board.

In the case of table games, a card reader 129 may be associated with the table (e.g., the card reader located on or near the table game). Players may utilize the card reader to identify themselves. Information regarding play of the table game may be input through an input device by a dealer, coin counter or the like, and this information may be transmitted to the player-tracking server 128.

In one embodiment, the gaming system/environment 122 may include an accounting system, which includes at least one accounting server 130. The accounting server 130 may comprise a computing device including a processor and a memory. The accounting server 130 is preferably adapted to perform financial related functions, such as track financial transactions such as bets and payouts, and perform reconciliations with monies collected from the gaming system devices 124, such as gaming machines 125 and table games 127. The accounting server 130 may be associated with a wide variety of devices, including individual gaming system devices 124 and other servers. Once again, a communication link may be provided between the accounting server 130 and each device with which communication is desired.

In one embodiment, the gaming system/environment 122 may include a progressive award system, which includes at least one progressive server 132. The progressive server 132 may comprise a computing device including a processor and a memory. The progressive server 132 may be designed to generate progressive award information. In one arrangement, the progressive server 132 may obtain information regarding amounts bet at specific gaming system devices 124, such as gaming machines 125 or table games 127. Utilizing this information, a progressive jackpot award amount may be generated and updated using a specified protocol. The information may be transmitted to one or more displays 134 associated with participating gaming system devices 124. Once again, a communication link is preferably provided between the progressive server 132 and each device with which communication is desired. For example, a link may be provided between the progressive server 132 and accounting server 130 for providing payout information to the accounting server 130. The accounting server 130 also reads the paid amounts from the electronic gaming machines 125 as well and makes sure the paid amounts match what the progressive server 132 claimed the paid amounts should have been. If the paid amounts do not match, then the accounting server 130 may raise a flag for further investigation by casino staff or regulators.

A physical and/or virtual information host 136 is associated with or comprises a portion of the gaming system/environment 122. In one embodiment, the host 136 comprises a computing device, which includes a processor, memory and a display. The virtual information host 136 may be one or more devices separate from devices performing other functions of the system/environment 122, or may be integrated with existing devices. The virtual information host 136 may be designed and adapted to perform functions relating to acquiring, managing, rendering, generating and/or displaying real-time and/or non real-time casino gaming system or "gaming environment" graphical information and information regarding one or more components of the gaming system or environment. Such functionality may also include the generation of at least one graphical user interface on at least one PED (e.g., mobile device 131), which is configured or designed to graphically display information (e.g., real-time casino information) relating to selected aspects of casino activity. Also, different graphical user interfaces may be displayed on an external application, such as on an application of a computer, smartphone, and/or on any type of mobile device 131. In one embodiment, bi-directional communication channels 121 are provided for direct, two-way communication between the host 136 and at least one game server 126 and at least one player tracking server 128, and/or any other device with which communication is desired.

As illustrated in the example of FIG. 1, gaming system/environment 122 may also include one or more mobile devices 131 configured or designed to communicate, via one or more wireless links 111, with various components of the gaming environment 100 such as, for example: information systems (e.g., virtual information host 136); player tracking systems; accounting systems; employee management systems; location positioning systems (e.g., GPS system 133); game servers; surveillance systems; security systems; communications systems; gaming systems (e.g., gaming machines 125, game table devices 127, other mobile devices 131, etc.); etc.

Figure 2:
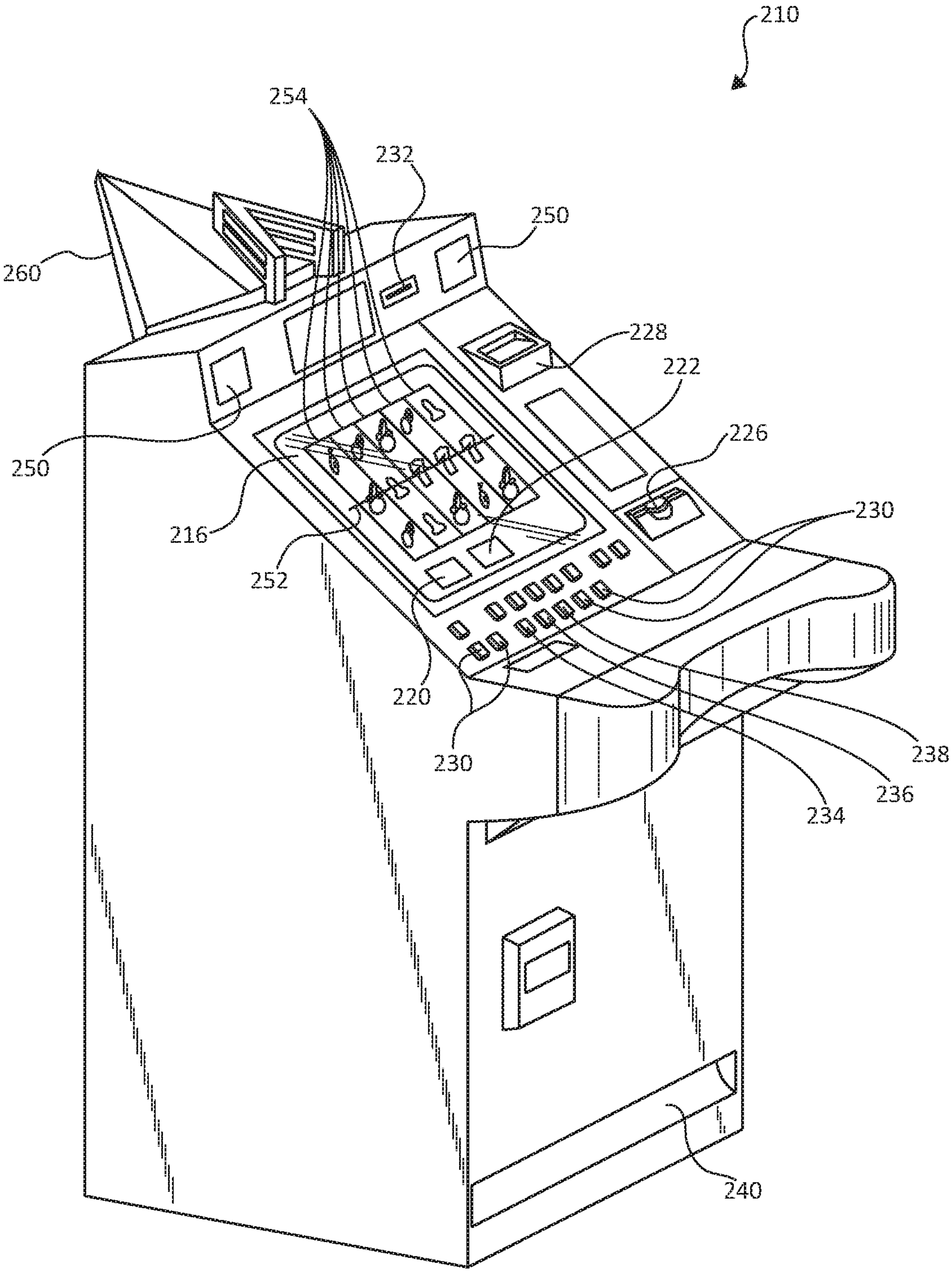
FIG. 2 is a perspective view of one embodiment of a slot machine or gaming device suitable for use in the gaming system of FIG. 1.

FIG. 2 is a perspective view of one embodiment 210 of a slot machine, EGM, or other gaming device suitable for use in the previously depicted system of FIG. 1, in which aspects of the present disclosure may be realized. FIG. 2 represents a base EGM 210 that may be employed in the shared display system or the gaming system of the present disclosure. FIG. 2 illustrates features common to each of the gaming devices. In one embodiment, EGM 210 has a support structure, housing or cabinet, which provides support for a plurality of displays, inputs, controls and other features of a conventional gaming machine. In the illustrated embodiment, the player plays EGM 210 while sitting, however, the gaming device is alternatively configured so that a player may operate it while standing or sitting. The illustrated EGM 210 is positioned on the floor but may be positioned alternatively (i) on a base or stand, (ii) as a pub-style table-top game (e.g., where the participant gaming devices are located remotely from the shared wheel as discussed below), (iii) as a stand-alone gaming device on the floor of a casino with other stand-alone gaming devices, which the player operates while standing or sitting (e.g., where the participant gaming devices are located remotely from the shared wheel as discussed below), or (iv) in any other suitable manner. The EGM 210 may be constructed with varying cabinet and display configurations. Also, referring to an embodiment for the electronic configuration of EGM 210, each gaming device may include the components described below in FIG. 3A and FIG. 3B.

In one embodiment, each EGM 210 randomly generates awards and/or other game outcomes based on probability data. That is, each award or other game outcome is associated with a probability and each gaming device generates the award or other game outcome to be provided to the player based on the associated probabilities. Since each EGM 210 generates outcomes randomly or based upon a probability calculation, there is no certainty that the EGM 210 will provide the player with any specific award or other game outcome.

In another embodiment, as discussed in more detail below, each EGM 210 employs a predetermined or finite set or pool of awards, progressive awards, prizes or other game outcomes. As each award or other game outcome is provided to the player, the EGM 210 removes the provided award or other game outcome from the predetermined set or pool. Once removed from the set or pool, the specific provided award or other game outcome may not be provided to the player again. The EGM 210 provides players with all of the available awards or other game outcomes over the course of the play cycle and guarantees a designated amount of actual wins and losses.

Figure 3A:
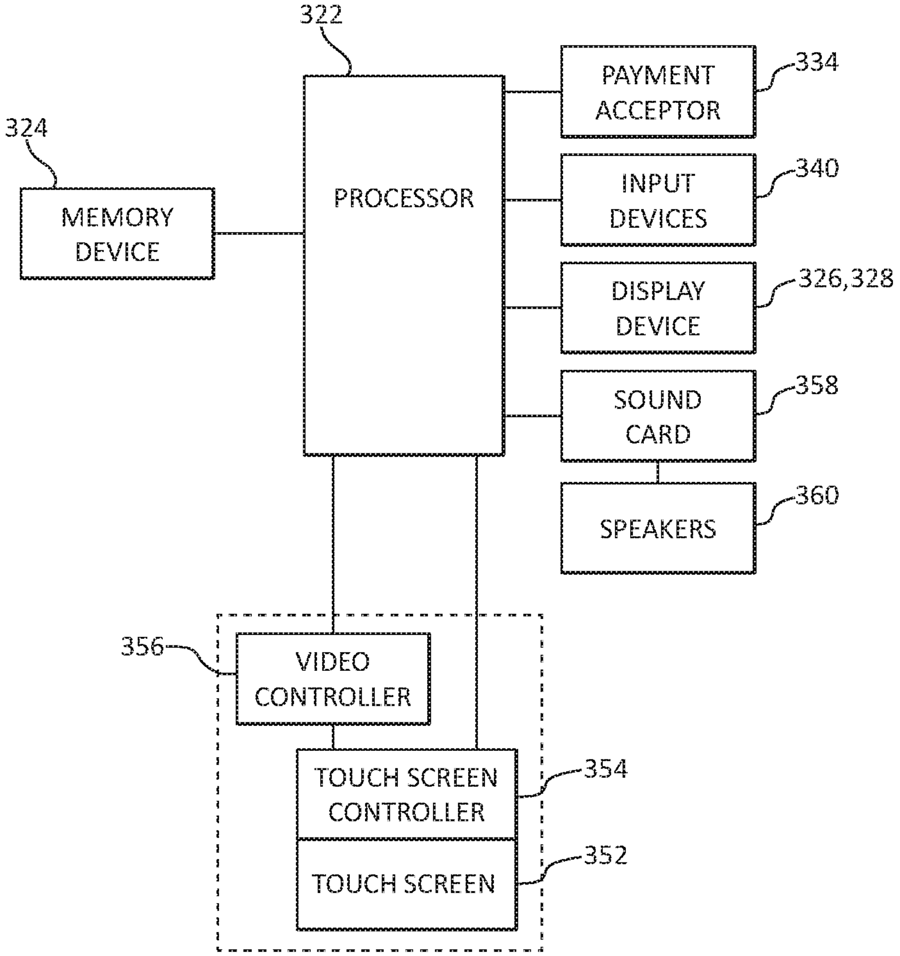
FIG. 3A is a block diagram illustrating an electronic configuration for use in the gaming device of FIG. 2.

As seen in FIG. 2, the EGM 210 includes a credit display 220 that displays a player's current number of credits, cash, account balance or the equivalent. In one embodiment, EGM 210 includes a bet display 222 that displays a player's amount wagered. As illustrated in FIG. 3A, in one embodiment, each EGM 210 includes at least one payment acceptor 334 (FIG. 3A) that communicates with processor 322 (FIG. 3A).

As seen in FIG. 2, the payment acceptor 334 (FIG. 3A) in one embodiment includes a coin slot 226, where the player inserts coins or tokens, and a ticket, note or bill acceptor 228, where the player inserts a bar-coded ticket, note, or cash. In one embodiment, a player-tracking card, credit card, debit card or data card reader/validator 232 is also provided for accepting any of those or other types of cards.

In one embodiment, a player inserts an identification card into card reader 232 of EGM 210. The identification card may be a smart card having a programmed microchip or a magnetic strip coded with a player's identification, credit totals and other relevant information. In one embodiment, money may be transferred to EGM 210 through an electronic fund transfer and card reader 232 using the player's credit, debit or smart card. When a player funds EGM 210, processor 322 (FIG. 3A) determines the amount of funds entered and the corresponding amount is shown on the credit or other suitable display as described above. In one embodiment, after appropriate funding of EG1\r1210, the player presses a play button 234 or pull arm (not illustrated) to start any primary game or sequence of events. In one embodiment, upon appropriate funding, EGM 210 begins game play automatically. In another embodiment, the player needs to actuate or activate one of the play buttons to initiate play of EGM 210.

As shown in FIG. 2, a bet one button 236 is provided. The player places a bet by pushing bet one button 236. The player increases the player's wager by one credit each time the player pushes bet one button 236. When the player pushes the bet one button 236, the number of credits shown in the credit display 220 decreases by one, and the number of credits shown in the bet display 222 increases by one. A max bet max button (not shown) may also be provided, which enables the player to bet the maximum wager (e.g., max lines and max wager per line). EGM 210 may include other suitable wager buttons 230, such as a max bet button, a repeat bet button, one or more select paylines buttons, and one or more select wager per pay line buttons. In one aspect, the wager buttons 230 may also include and/or be a joystick or hand held controller device (not shown for illustrative convenience). For example, the wager button may be a joystick in which a player may play a skill-based game where one or more skill-based inputs may be detected.

In one embodiment, a cash out button 238 is provided. The player presses cash out button 238 and cashes out to receive a cash payment or other suitable form of payment corresponding to the number of remaining credits. The player may receive coins or tokens in a coin payout tray 240 or a ticket or credit slip, which are redeemable by a cashier or funded to the player's electronically recordable identification card. Each EGM 210 also includes one or a plurality of communication ports for enabling communication of a processor with one or more external peripherals, such as external video sources, expansion buses, expansion games or other displays, an SCSI port, or a key pad.

In one embodiment of FIG. 2, in combination within FIG. 3A, a touchscreen 352 (FIG. 3A) is provided and operates with a touchscreen controller 354, processor 322 (FIG. 3A) and display device 326,328 (FIG. 3A). Touchscreen 352 (FIG. 3A) and the touchscreen controller 354 are also connected to a video controller 356. The player touches touchscreen 352 at appropriate places to input decisions and signals into processor 322 of EGM 210. Also, each EGM 210 may include a sound generating device controlled by one or more sounds cards 358, which function in conjunction with processor 322 (FIG. 3A). In one embodiment, the sound generating device includes at least one speaker 250 or other sound generating hardware and/or software for generating sounds, such as playing music for the primary and/or secondary game or for other modes of the gaming device, such as an attract mode. In one embodiment, each EGM 210 provides dynamic sounds coupled with attractive multimedia images displayed on display device 216 to provide an audio-visual representation or to otherwise display full-motion video with sound to attract players to EGM 210. During idle periods, the EGM 210 displays a sequence of audio and/or visual attraction messages to attract potential players to EGM 210. The videos in one embodiment are customized to provide information concerning the shared display of the present disclosure as discussed below.

In one embodiment, EGM 210 includes a camera in communication with a processor, which is positioned to acquire an image of a player playing EGM 210 and/or the surrounding area of EGM 210. In one embodiment, the camera may be configured to selectively acquire still or moving (e.g., video) images and may be configured to acquire the images in either an analog, digital or other suitable format. Display device 216 may be configured to display the image acquired by the camera as well as display the visible manifestation of the game in split screen or picture-in-picture fashion. For example, the camera may acquire an image of the player and that image may be incorporated into the primary and/or secondary game as a game image, symbol or indicia.

In one embodiment, as illustrated in FIG. 2, a base or primary game includes a slot game with one or more paylines 252. Paylines 252 may be horizontal, vertical, circular, diagonal, angled or any combination thereof. For a slot game, EGM 210 displays at least one reel and preferably a plurality of reels 254, such as three to five reels, in either electromechanical form with mechanical rotating reels or in video form with simulated reels and movement thereof. Each reel 254 displays a plurality of indicia such as bells, hearts, fruits, numbers, letters, bars or other images, which preferably correspond to a theme associated with the gaming device. With a slot game, EGM 210 awards prizes when reels 254 stop spinning and display a winning or paying symbol or combination of symbols on an active payline 252.

In one embodiment, each EGM 210 includes indicators 260. Indicators 260 reside on the top of each EGM 210 and point to or indicate one of the awards or outcomes on top of the shared display (not shown) when the shared display stops spinning to reveal randomly or otherwise generated results or outcomes. Indicators 260 may illuminate differently at different times or states for the EGM 210. The illumination of the indicators 260 in one embodiment depends upon whether the EGM 210 is playing a base game, is in a state in which the player is eligible to play the shared display bonus, is in a state in which the player has committed to play the shared display bonus, or is in a state in which the player has declined to play a particular upcoming shared display bonus, as well as other states discussed below.

FIG. 3A is a block diagram illustrating an electronic configuration for use in the gaming device of FIG. 2, here again in which aspects of the present disclosure may be realized. In the embodiment illustrated in FIG. 3A the player station may include at least one processor 322, such as a microprocessor, a microcontroller-based platform, a suitable integrated circuit or one or more ASICs. The processor 322 is in communication with or operable to access or to exchange signals with at least one data storage or memory device 324. In one embodiment, the processor 322 and the memory device 324 reside within the cabinet of the player station. The memory device 324 stores program code and instructions, executable by the processor 322, to control the player station. The memory device 324 also stores other data such as image data, event data, player input data, random or pseudo-random number generators, pay-table data or information and applicable game rules that relate to the play of the player station. In one embodiment, the memory device 324 includes random access memory (RAM), which may include non-volatile RAM (NVRAM), magnetic RAM (NVRAM), ferroelectric RAM (FeRAM) and other forms as commonly understood in the gaming industry. In one embodiment, the memory device 324 includes read only memory (ROM). In one embodiment, the memory device 324 includes flash memory and/or EEPROM. Any other suitable magnetic, optical and/or semiconductor memory may operate in conjunction with the player station and gaming system disclosed herein.

In one embodiment, part or all of the program code and/or operating data described above may be stored in a detachable or removable memory device, including, but not limited to, a suitable cartridge, disk, CD ROM, DVD or USB memory device. In other embodiments, part or all of the program code and/or operating data described above may be downloaded to the memory device through a suitable network.

In one embodiment, an operator or a player may use such a removable memory device in a desktop computer, a laptop personal computer, a personal digital assistant (PDA), portable computing device, or other computerized platform to implement the present disclosure. In one embodiment, the gaming system is operable over a wireless network, such as part of a wireless gaming system. In this embodiment, the player station may be a handheld device (e.g., a PED) or any other suitable wireless device that enables a player to play any suitable game at a variety of different locations. It should be appreciated that a player station as disclosed herein may be a device (e.g., an EGM) that has obtained approval from a regulatory gaming commission or a device that has not obtained approval from a regulatory gaming commission. It should be appreciated that the processor and memory device may be collectively referred to herein as a "computer" or "controller."

In one embodiment, a background play feature may be available where a player, who may be sitting at the lounge and/or at the bar with friends (at the casino), may be playing a machine from the floor by remote via the external application (e.g., a PED). The player may substitute into the same game he wanted from an online game and play, or back-end the actual game though a venue network. The game may be bankrolled by the venue the player was inside. If the player was to win, the player could collect from that venue where the player was located, and/or instead of "reserving" a machine he could continue the game with an auto play during a period of time the player took a break/recess. In one embodiment, a team game may be played by a group of players (e.g., a group of 3 or 4 players) and the group of players may watch and/or play the same game on each player's individual external device (e.g., a computer and/or smartphone). Similarly, as described above, the team game may be played by a group of players from a remote location (e.g., bar, lounge, casino, home, office, restaurant, etc.). In one embodiment, the team game may be played by a group of players and the group of players may share credit inputs and wins. In one embodiment, the team game may be played by the group of players and the group of players may sell off and/or share double up options and/or credits to other team players of the group.

In one embodiment, as discussed in more detail below, the gaming device randomly generates awards and/or other game outcomes based on probability data. In one such embodiment, this random determination is provided through utilization of a Random Number Generator (RNG), such as a true random number generator, a pseudo random number generator or other suitable randomization process. In one embodiment, each award or other game outcome is associated with a probability and the player station generates the award or other game outcome to be provided to the player based on the associated probabilities. In this embodiment, since the player station generates outcomes randomly or based upon one or more probability calculations, there is no certainty that the player station will ever provide the player with any specific award or other game outcome. In another embodiment, each award or other game outcome is associated with a probability and the central controller or server generates the award or other game outcome to be provided to the player based on the associated probabilities. In one embodiment, each of the player stations includes an RNG and the central server controls the display of the central display. It should be appreciated there may be one or more RN Gs per: (a) display segment; (b) central display; (c) player station; (d) number of games; (e) the number of potential games; or (t) any combination of the above. It should also be appreciated that one or more processors may work together and communicate to accomplish any suitable function of the gaming system.

In another embodiment, the gaming system employs a predetermined or finite set or pool of awards or other game outcomes. In this embodiment, as each award or other game outcome is provided to the player, the central controller flags or removes the provided award or other game outcome from the predetermined set or pool. Once flagged or removed from the set or pool, the specific provided award or other game outcome from that specific pool may not be provided to the player again. This type of gaming system provides players with all of the available awards or other game outcomes over the course of the play cycle and guarantees the amount of actual wins and losses.

In one embodiment, as mentioned above and seen in FIG. 3A, one input device is a touchscreen 352 coupled with a touchscreen controller 354, or some other touch-sensitive display overlay to allow for player interaction with the images on the display. The touchscreen 352 and the touchscreen controller 354 are connected to a video controller 356. A player may make decisions and input signals into the player station by touching the touchscreen at the appropriate places. One such input device is a conventional touchscreen button panel. In another embodiment, a plurality or each of the display segments is a touchscreen 352 coupled with a touchscreen controller 354 or some other touch-sensitive display overlay to allow for player interaction with the images on the display segments. The touchscreens 352 and the touchscreen controllers 354 are connected to a video controller 356. The player station may further include a plurality of communication ports for enabling communication of the processor with external peripherals, such as external video sources, expansion buses, game or other displays, an SCSI port or a key pad. In one embodiment, at least one payment acceptor 334 that communicates with processor 322 for playing a bet, input devices 340, and display devices 326, 328 are provided.

The player stations, the central controller, and the display segments may include serial interfaces and/or Ethernet (e.g., a G2S protocol uses commodity Ethernet equipment and TCP/IP) to connect to specific subsystems or subnets internal and external to the player stations, central controller, and the display segments. The serial devices may have electrical interface requirements that differ from the "standard" EIA serial interfaces provided by general-purpose computers. These interfaces may include EIA, Fiber Optic Serial, optically coupled serial interfaces, current loop style serial interfaces, etc. In addition, to conserve serial interfaces internally in the player station, serial devices may be connected in a shared, daisy-chain fashion where multiple peripheral devices are connected to a single serial channel.

The serial interfaces and/or Ethernet may be used to transmit information using communication protocols that are unique to the gaming industry. For example, SAS is a communication protocol used to transmit information, such as metering information, from a player station to a remote device. Often SAS is used in conjunction with a player tracking system. EGMs may be treated as peripheral devices to a casino communication controller and connected in a shared daisy chain fashion to a single serial interface and/or Ethernet. In both cases, the peripheral devices are preferably assigned device addresses. If so, the serial controller circuitry must implement a method to generate or detect unique device addresses. In one embodiment, security-monitoring circuits detect intrusion into a player station or gaming station by monitoring security switches attached to access doors in a designated area, such as a player station cabinet. In one embodiment, access violations result in suspension of game play and may trigger additional security operations to preserve the current state of game play. These circuits also function when power is off by use of a battery backup. In one embodiment, as seen in FIG. 3A, the player station includes a sound generating device controlled by one or more sound cards 358 which function in conjunction with the processor. In one embodiment, the sound generating device includes at least one and preferably a plurality of speakers 360 or other sound generating hardware and/or software for generating sounds, such as playing music for the primary and/or secondary game or for other modes of the player station, such as an attract mode. In one embodiment, the player station provides dynamic sounds coupled with attractive multimedia images displayed on one or more of the display devices to provide an audio-visual representation or to otherwise display full-motion video with sound to attract players to the player station. During idle periods, the player station may display a sequence of audio and/or visual attraction messages to attract potential players to the player station. The videos may also be customized for or to provide any appropriate information.

In one embodiment, the gaming system may include a sensor, such as a camera in communication with the processor (and possibly controlled by the processor) that is selectively positioned to acquire an image of a player actively using the player station and/or the surrounding area of the player station. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia. In another embodiment, the gaming system includes a wireless transceiver or a camcorder and the display segments are components of or are connected to televisions, satellites, DVD players, digital video recorders and Internetenabled devices. In one embodiment, the game may be displayed on the central display and replicated on one or more of the player stations. In another embodiment, the game is only displayed on the central display and the player station is only used to input decisions or commands in the game. In another embodiment, a primary or base game is displayed on the player station and/or the central display and one or more bonus games are displayed on the central display only. In one embodiment, the player stations provide other information to a player, such as the win/loss history of that certain game or the win/loss history of that player. It should be appreciated that the central display and the player stations may work together with a central controller or a plurality of servers to provide the games to the player in any suitable manner.

Figure 3B:
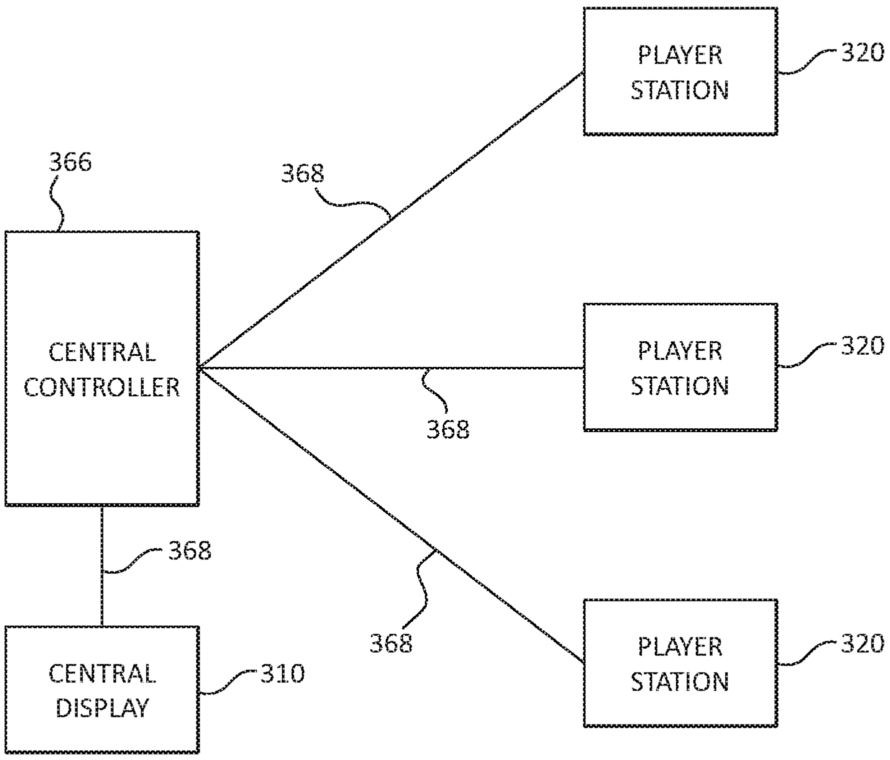
FIG. 3B is a block diagram illustrating player stations in communication with a central controller and a central display in communication with the central controller for use in the gaming device of FIG. 2.

FIG. 3B is a block diagram illustrating a player station 320 in communication with a central controller 366 and a central display 310 in communication with the central controller 366 for use in the gaming device of FIG. 2, in which aspects of the present disclosure may be realized. In one embodiment, as illustrated in FIG. 3B, one or more of the player stations 320 are in communication with each other and/or at least one central server, central controller or remote host 366 through a data network, or remote communication link 368. The central server, central controller or remote host is any suitable server or computing device, which includes at least one processor and at least one memory or storage device, and may also be in communication with a central display 310. In other embodiments, the central server is a progressive controller or a processor of one of the player stations in the gaming system. In these embodiments, the processor of each player station is configured to transmit and receive events, messages, commands, a current progressive value, or any other suitable data or signal between the individual player station and the central server. The player station processor is operable to execute such communicated events, messages or commands in conjunction with the operation of the player station. Moreover, the processor of the central server is configured to transmit and receive events, messages, commands, or any other suitable data or signal between the central server and each of the individual player stations. The central server processor is operable to execute such communicated events, messages or commands in conjunction with the operation of the central server. It should be appreciated that one or more of each of the functions of the central controller may be performed by one or more player station processors. It should be further appreciated that one or more of each of the functions of one or more player station processors, as disclosed herein, may be performed by the central controller. In one embodiment, the central controller has an Uninterruptible Power Supply ("UPS"). In one embodiment, the UPS is a rack mounted UPS module.

In one embodiment, the game outcome provided to the player is determined by a central server or controller and provided to the player at the player station. In this embodiment, each of the player stations is in communication with the central server or controller. Upon a player initiating game play at one of the player stations, the initiated player station communicates a game outcome request to the central server or controller. In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. The central server or controller is capable of storing and utilizing program code or other data similar to the processor and memory device of the player station. In an alternative embodiment, the central server or controller maintains one or more predetermined pools or sets of predetermined game outcomes. The central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and may not be selected by the central controller or server upon another wager. The provided game outcome may include a primary game outcome, a secondary game outcome, primary and secondary game outcomes, or a series of game outcomes. The central server or controller communicates the generated or selected game outcome to the initiated player station. The player station receives the generated or selected game outcome and provides the game outcome to the player. In an alternative embodiment, how the generated or selected game outcome is to be presented or displayed to the player, such as a reel symbol combination of a player station or a hand of cards dealt in a card game, is also determined by the central server or controller and communicated to the initiated player station to be presented or displayed to the player. Central production or control may assist a gaming establishment or other entity in maintaining appropriate records, controlling gaming, reducing and preventing cheating or electronic or other errors, and reducing or eliminating win-loss volatility.

In one embodiment, the player stations disclosed herein are associated with or otherwise integrated with one or more player tracking systems. In this embodiment, the player station and/or player tracking system tracks players' gaming activity at the player station. In one such embodiment, the player station and/or associated player tracking system timely tracks when a player inserts their playing-tracking card to begin a gaming session and also timely tracks when a player removes their player-tracking card when concluding play for that gaming session. In another embodiment, rather than requiring a player to insert a player tracking card, the player station utilizes one or more portable devices carried by a player, such as a cell phone, a radio frequency identification tag or any other suitable wireless device to track when a player begins and ends a gaming session. In another embodiment, the player station utilizes any suitable biometric technology or ticket technology to track when a player begins and ends a gaming session. During one or more gaming sessions, the player station and/or player tracking system tracks any suitable information, such as any amounts wagered, average wager amounts and/or the time these wagers were placed. In different embodiments, for one or more players, the player tracking system includes the player's account number, the player's card number, the player's first name, the player's surname, the player's preferred name, the player's player tracking ranking, any promotion status associated with the player's player-tracking card, the player's address, the player's birthday, the player's anniversary, the player's recent gaming sessions, or any other suitable data. The player stations are capable of being connected together through a data network. In one embodiment, the data network is a local area network (LAN), in which one or more of the player stations are substantially proximate to each other and an on-site central server or controller as in, for example, a gaming establishment or a portion of a gaming establishment. In another embodiment, the data network is a wide area network (WAN) in which one or more of the player stations are in communication with at least one off-site central server or controller. The player stations may be located in a different part of the gaming establishment or within a different gaming establishment than the off-site central server or controller. Thus, the WAN may include an off-site central server or controller and an off-site player station located within gaming establishments in the same geographic area, such as a city or state. The WAN gaming system may be substantially identical to the LAN gaming system described above, although the number of player stations in each system may vary relative to each other.

In one embodiment, as a benefit to one or more of the gaming venues (e.g., a casino), the player tracking system may be used, along with use of the GPS positioning, for identifying the movements of the players throughout the gaming venues. Also, the player tracking system may be used to identify cash, money, credits, and award amounts spent by the player. In an additional aspect, the player tracking system may be used to identify various patterns and trends (e.g., historical) for generating visual graphs while displaying showing top view of the gaming venue (e.g., looking down from above the gaming venue) to improve casino layouts and identify patterns and movements of all types of players.

In another embodiment, the data network is an Internet or intranet. The operation of the player station may be viewed at the player station with at least one Internet browser. Operation of the player station and accumulation of credits may be accomplished with only a connection to the central server or controller (the Internet/intranet server) through a conventional phone or other data transmission line, digital subscriber line (DSL), T-I line, coaxial cable, fiber optic cable, WIFI, or other suitable connection. Players may access an Internet game page from any location where an Internet connection and computer, or other Internet facilitator is available. The expansion in the number of computers and number and speed of Internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

In another embodiment, as described above, the gaming system is in communication with a central server or controller. The central server or controller may be any suitable server or computing device, which includes at least one processor and a memory or storage device. In alternative embodiments, the central server is a progressive controller or another player station in the gaming system. In one embodiment, the memory device stores different game programs and instructions, executable by a player station processor, to control the player station. Each executable game program represents a different game or type of game, which may be played on one or more of the player stations in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the player station) or vice versa.

In this embodiment, one, all, or a plurality of the player stations at least includes one or more display devices and/or one or more input devices for interaction with a player. A local processor, such as the above-described player station processor or a processor of a local server, is operable with the display device(s) and/or the input device(s) of one or more of the player stations. In operation, the central controller is operable to communicate one or more of the stored game programs to at least one local processor. In different embodiments, the stored game programs are communicated or delivered by embedding the communicated game program in a device or a component (e.g., a "chip" to be inserted in a player station), writing the game program on a disc or other media, downloading or streaming the game program over a dedicated data network, Internet or telephone line. After the stored game programs are communicated from the central server, the local processor executes the communicated program to facilitate play of the communicated program by a player through the display device(s) and/or input device(s) of the player station. That is, when a game program is communicated to a local processor, the local processor changes the game or type of game played at the player station or displayed on the display segment. Though the illustrated embodiments are described with the central controller determining a game result for the player and communicating that result to the central display 310 and one or more player stations, any other suitable game determining method may be employed in any embodiment of the present disclosure. In one embodiment, the central display 310 is associated with a central display 310 server. This central display 310 server determines the game outcome for the games played on each of the display segments. The central display 310 server communicates the game outcome to the central controller, which communicates the game outcome to one or more of the player stations.

In one embodiment, the central controller determines the award to provide to the player based on the game outcome. In another embodiment, the player stations determine the award and/or progress jackpot/value to provide to the players based on the game outcome. In another embodiment, the central controller determines the game outcome displayed on the central display 310 and the player station determines any award and/or progress jackpot/value to provide to the player based on the game outcome. The player station determines both the game outcome and any award to provide to the player based on the game outcome. In another embodiment, the central controller determines part of the outcome and the player station determines part of the outcome. That is, both the central controller and the player station determine part of a player's outcome and/or award.

Further, in the gaming industry, many different manufacturers make gaming machines and player stations. The communication protocols on the player station may be hard-wired into the player station and each player station/gaming machine manufacturer may utilize a different proprietary communication protocol. A player station manufacturer may also produce host systems, in which case their player stations are compatible with their own host systems. However, in a heterogeneous gaming environment, player stations from different manufacturers, each with its own communication protocol, may be connected to host systems from other manufacturers, each with another communication protocol. Therefore, communication compatibility issues regarding the protocols used by the player stations in the system and protocols used by the host systems must be considered.

In another embodiment, player stations at one or more gaming sites may be networked to a central server in a progressive configuration, wherein a portion of each wager to initiate a base or primary game may be allocated to bonus or secondary event awards. In one embodiment, a host site computer is coupled to central servers at a variety of mutually remote gaming sites for providing a multi-site linked progressive automated gaming system. The host site computer may serve player stations distributed throughout a number of properties at different geographical locations including, for example, different locations within a city or different cities within a state. The host site computer may be maintained for the overall operation and control of the system. A host site computer may oversee the entire progressive gaming system and may be the master for computing all progressive jackpots and values for each and every gaming device. All participating gaming sites report to, and receive information from, the host site computer. Each central server computer may be responsible for all data communication between the player station hardware and software and the host site computer. An individual player station may trigger a progressive win, for example through a game play event such as a symbol-driven trigger in the multi-component game. The central server or other central controller determines when a progressive win is triggered. The central controller and an individual player station may work in conjunction with each other to determine when a progressive win is triggered, for example through an individual player station meeting a predetermined requirement established by the central controller.

The progressive award win may be triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a player station is randomly or apparently randomly selected to provide a player of that player station one or more progressive awards. In one such embodiment, the player station does not provide any apparent reasons to the player for winning a progressive award, wherein winning the progressive award is not triggered by an event or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game. In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards).

In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner. In another embodiment, one or more of the progressive awards are partially funded via a side bet or side wager, which the player may make (and which may be tracked via a side bet meter). In one embodiment, one or more of the progressive awards are funded with only side bets or side wagers placed. In another embodiment, one or more of the progressive awards are funded based on a player's wagers as described above as well as any side bets or side wagers placed. In one alternative embodiment, a minimum wager level is required for a player station to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, players at a linked player station in a gaming system participate in a group gaming environment. In one embodiment, players at linked player stations work in conjunction with one another, such as playing together as a team or group, to win one or more awards. In one such embodiment, any award won by the group is shared, either equally or based on any suitable criteria, amongst the different players of the group. In another embodiment, players at linked player stations compete against one another for one or more awards. In one such embodiment, players at linked player stations participate in a gaming tournament for one or more awards. In another embodiment, players at linked player stations play for one or more awards wherein an outcome generated by one player station affects the outcomes generated by one or more linked player stations.

Turning now to FIGS. 4A-4D, an EGM, and more particularly, an interactive graphical user interface (GUI) of an EGM, is illustrated displaying a base game 400. Additionally illustrated is a skill-based bonus game 425, a consolation award for a skill-based bonus game 450, and an upgrade feature/award of a bonus symbol which is unlocked and used in a skill-based bonus game 475, in accordance with aspects of the present disclosure.

Figure 4A:
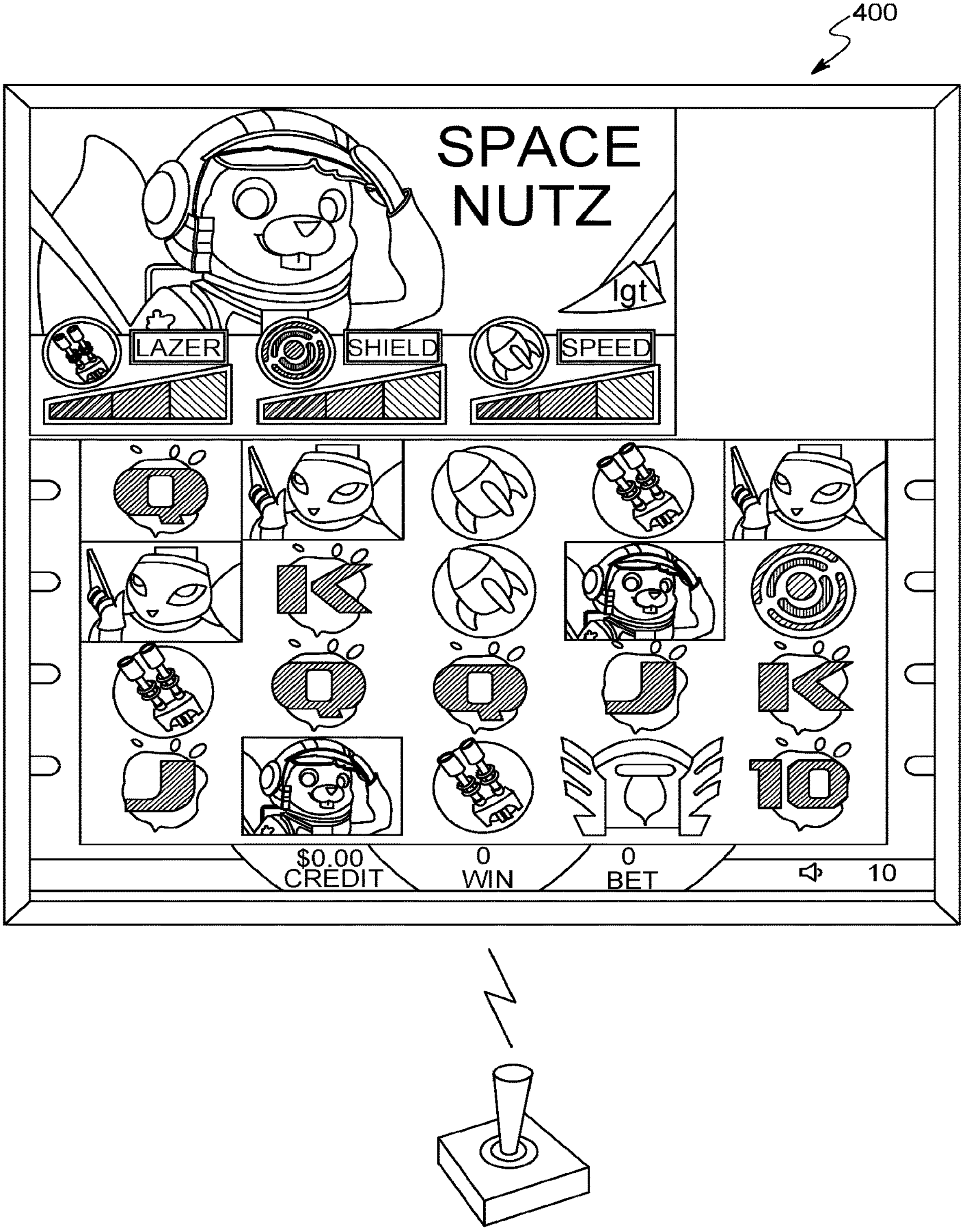
FIG. 4A depicts user-interface functionality of an EGM displaying a base game.

To illustrate the various games illustrated in FIGS. 4A-4D, consider an EGM (e.g., EGM 210) having a joystick, and deploying both a primary game (e.g., a slot game) and a skill-based game. By way of example only, the EGM 210 includes a game theme of a cartoon-based theme entitled "Space Nutz". Space Nutz may, in the instant example, include a "space squirrel" as a main character to promote an amusing game experience and attract a wider demographic of player, as illustrated in FIG. 4A. The primary slot game of the base game 400 includes three special upgrade symbols (bonus symbols) that may assist a player (not illustrated) in a subsequent and unlocked bonus game (i.e., the skill-based bonus game 425) when collected. That is, the three special upgrade symbols (e.g., a rocket for use in increasing speed, a laser gun for use as a weapon, and a shield for use as protection) may be collected in the primary slot game of the base game 400, and saved for use subsequently when the player enters the bonus game. The collected three illustrated special upgrade symbols may upgrade player weapons (e.g., a laser or "lazer"), protection/shields, and speed, although any combination of these or other implements for use in advancing the game play functionality may be employed in games of varying themes and styles, of course.

Figure 4B:
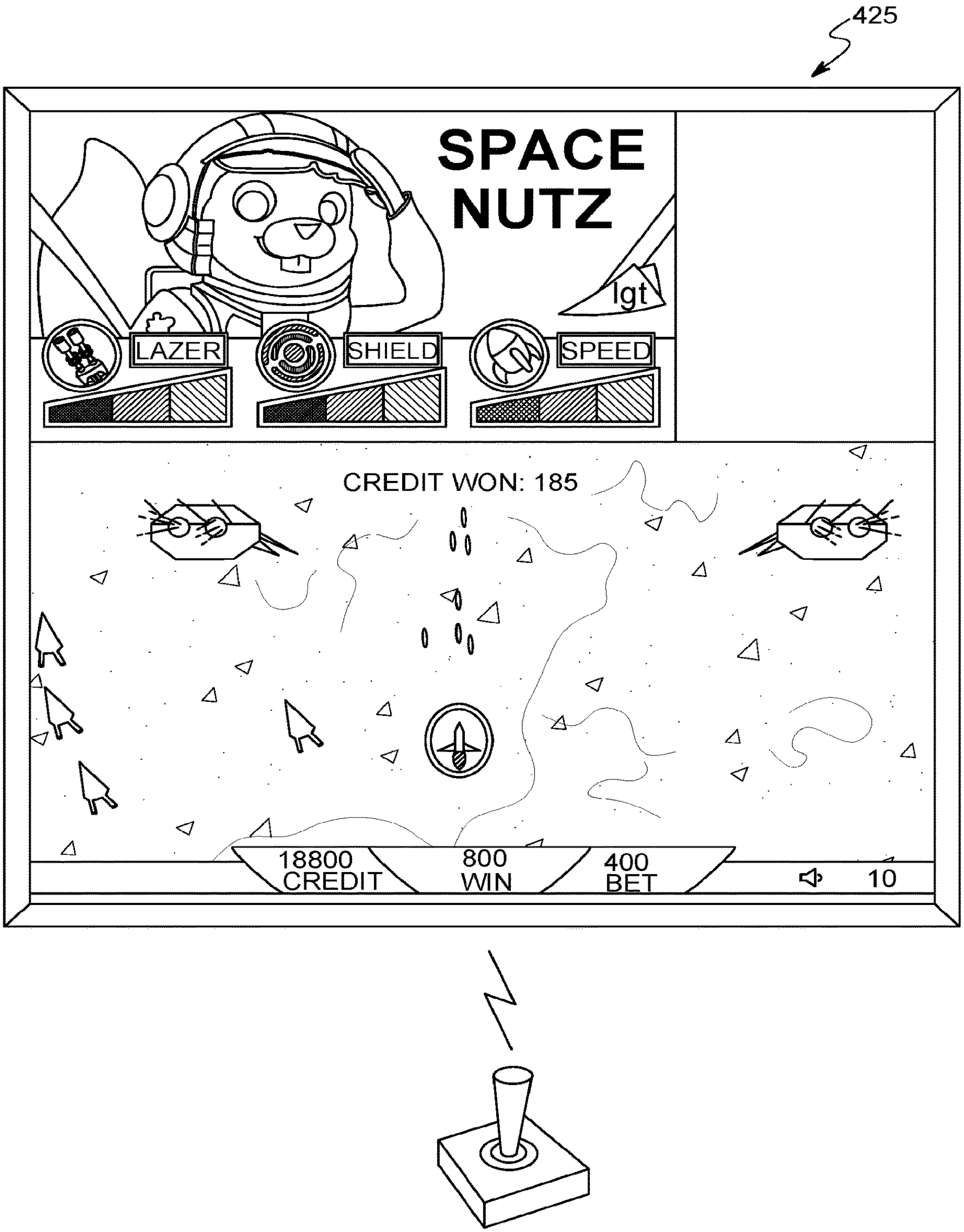
FIG. 4B depicts additional user-interface functionality of an EGM displaying a skill-based bonus game.

In some embodiments, any win during the primary slot game of the base game 400 having at least one upgrade symbol will upgrade the category (e.g., weapon, shield, speed) the upgrade symbol belongs to up to a predetermined number of times (e.g., each category may collect up to three upgrade symbols such as, for example, three upgrade symbols for speed). The upgrade symbols may be displayed on an upgrade symbol meter ("meter") on a section (e.g., a top section) of the EGM 210 GUI screen. When an upgrade symbol is collected (e.g., generated as a win for each play of the primary slot game of the base game 400), as illustrated in FIG. 4D, the upgrade symbol may "fly-up" from the base game 400 and register to the category of the meter that the upgrade symbols belongs to on the section of the EGM 210 GUI screen.

The skill-based game rests within collecting all of the upgrade symbols. That is, upon reaching a predetermined number of upgrade symbols (e.g., at least three upgrade symbols of a certain category) for one or more of the categories such as, for example, three laser upgrade symbols, the collected upgrade symbols may unlock the skill-based game (while the player is playing the base game 400). The skill-based game such as, skill-based game 425 of FIG. 4B, is now activated and the base game 400 may be paused and/or terminated while executing the skill-based game 425. The collected upgrade symbols collected during the base game 400 may then be used during the skill-based game 425. Again, by way of example only, the skill-based game 425 includes a "spacecraft" operated by the player. The spacecraft may use the one or more of the collected upgrade symbols (e.g., the laser gun and/or shield). For example, the player may employ the use of the shield to "protect" the spacecraft and forgive mistakes (e.g., such as when contacting an opposing spaceship or being hit by an opposing weapon). Additionally, there may be three bonus upgrades or "power ups" that the player may collect during the skill-based game 425 such as, for example, 1) a shield recharge, a weapon upgrade, which will increase the number of projectiles the player ship fires, 2) increasing area of effect of an upgrade symbol (e.g., providing the shield to cover a larger area of the spaceship), and/or 3) one or more award credits.

The EGM 210 enables the player to take control of the spaceship (or other game implement) with a joystick controller. The joystick, for example, may be used to detect one or more quantifiable skill-based inputs. For example, a detected input by the joystick may comprise identifying that the player has directed the joystick (which controls, for example, the direction of the spacecraft) up, down, right, left, forward, backward, rotate left, rotate right, or some combination thereof. That is, at least one of the quantifiable skill-based inputs is detected using the joystick as the player moves the joystick to thereby maneuver the spacecraft (or other game implement) about the screen to avoid the game opposition (e.g., opposing spacecrafts). The player may then press any button either on the EGM 210, the joystick, or a combination thereof to perform another quantifiable skill-based input that performs additional game play functionality (such as firing the primary weapons of the player's spacecraft by way of a "fire" action which fires or discharges the weapon). The quantifiable skill-based input may be set equal to an action of player movement and/or using one or more of the upgrade symbols. For example, a single input on a button of the joystick or EGf'0.1210 may be equal to one shot or "fire" of the primary Weapon (e.g., a single discharge of the weapon). That is, the cadence of the player firing the weapon (e.g., cadence of the quantifiable skill-based input) may be set equal to and/or match the pressing of a button as equal to 1 (e.g., a 1 for 1 ratio). In another aspect, pressing and holding the same (or another) button may cause the player's spacecraft weapon to fire at a constant rate (e.g., a rapid fire/"machine gun" approach), if the player had collected such functionality by way of the "weapon" upgrade symbol during the base game 400, for example.

Figure 4C:
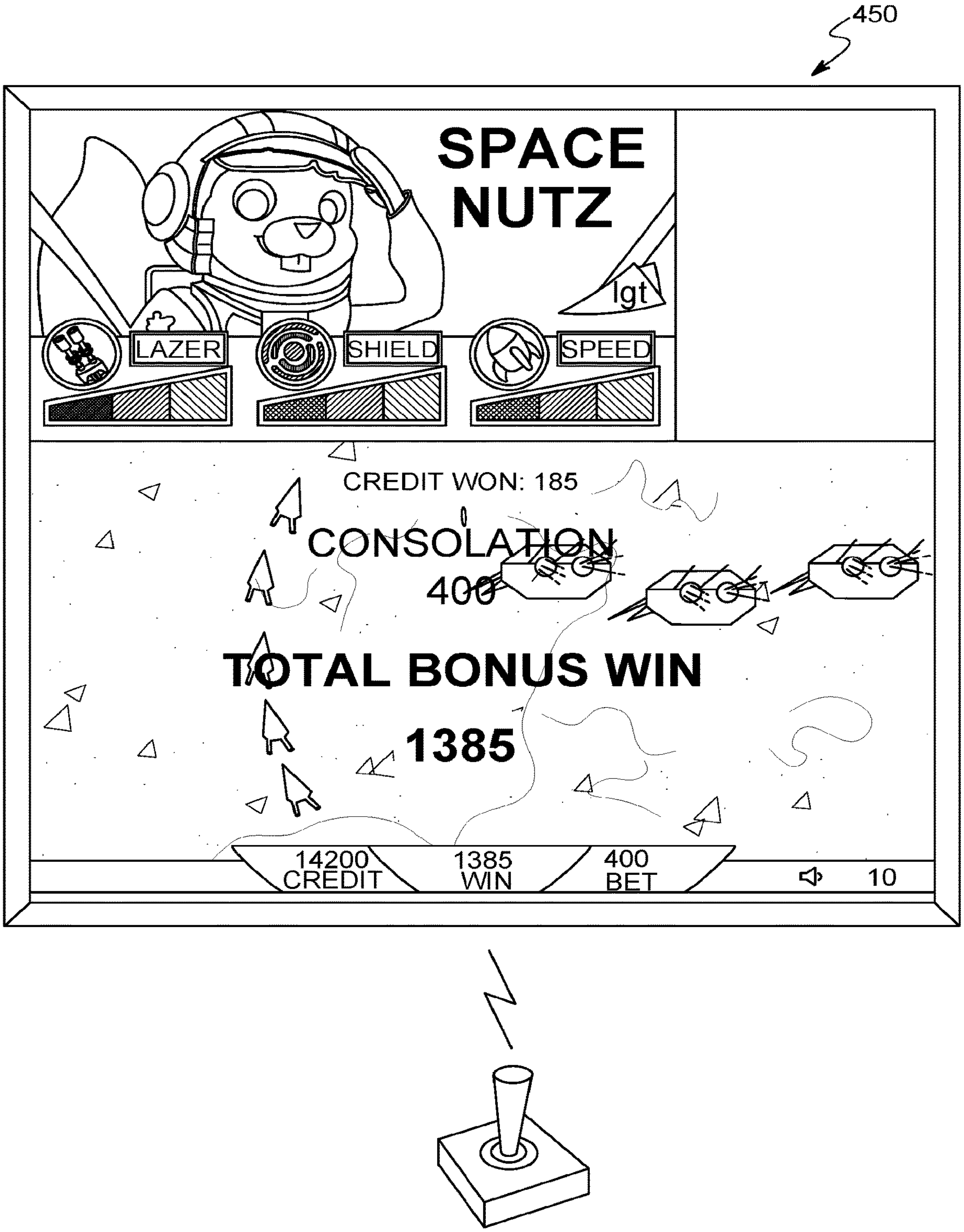
FIG. 4C depicts additional user-interface functionality of an EGM displaying a consolation award for a skill-based bonus game.
Figure 4D:
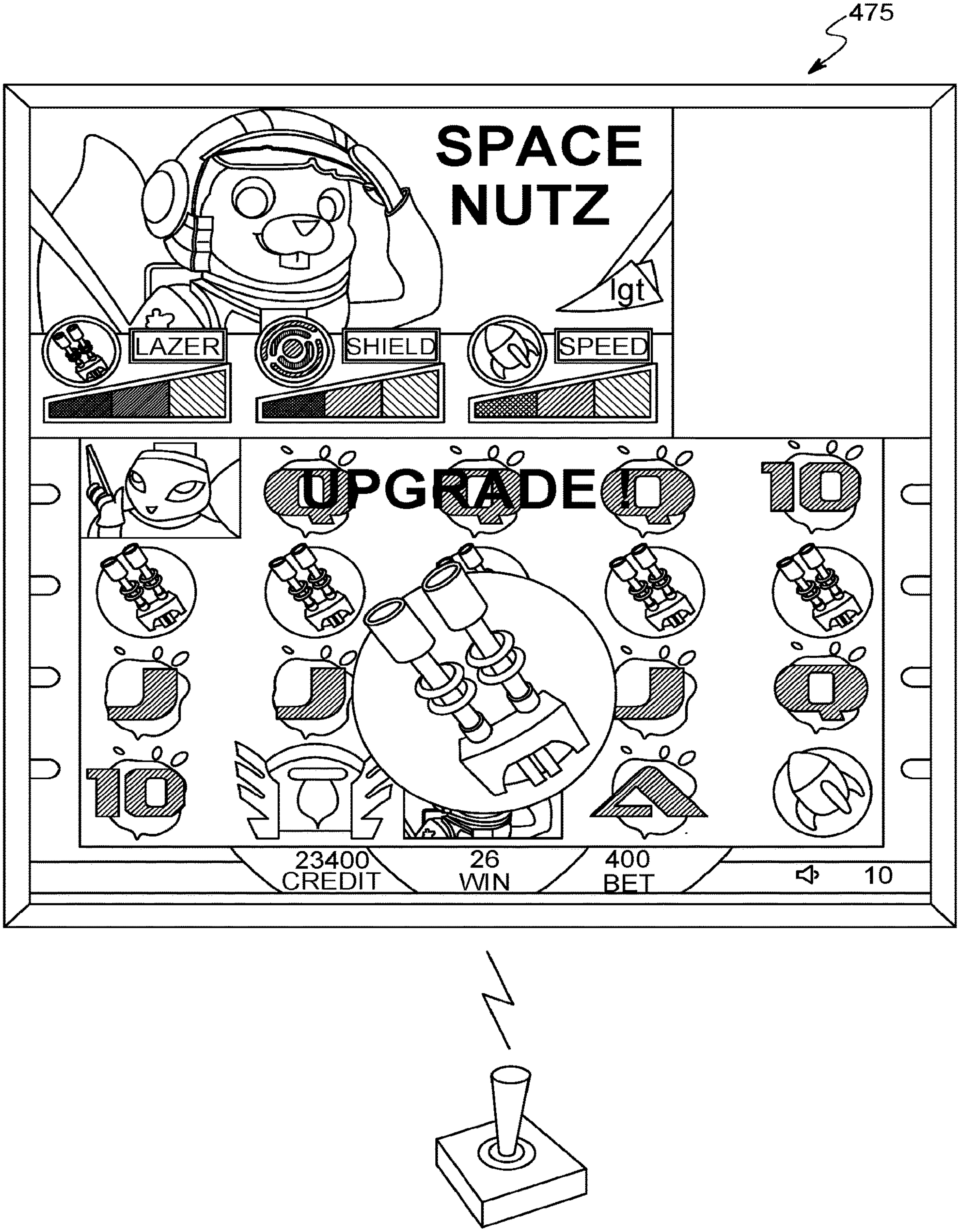
FIG. 4D depicts additional user-interface functionality of an EGM displaying an upgrade award of a bonus symbol for unlocking and using in a skill-based bonus game.

As the player overtakes the game opposition based on the quantifiable skill-based inputs and/or in combination with use of the collected upgrade symbols, the player may be awarded a credit value, as illustrated in FIG. 4C. Thus, a skilled player may potentially receive a higher payout than a player who performs with less skill while playing the skill-based game 425. That is, the player with more quantifiable skill-based inputs that are detected by the EGM 210 (or PED/mobile device 131, which may be used in association with the EGNI 210) may have a higher bonus score or credit winnings as compared to a player with less quantifiable skill-based inputs that are detected by the EGM 210 or PED/mobile device 131.

As additionally depicted in FIG. 4C, a consolation prize may be awarded as a consolation award bonus to a player regardless of their quantifiable skill-based input performance. That is, if a player fails to reach a predefined bonus award such as, for example, a win of credits greater than 100 credits, the consolation award bonus may be generated for the player. Once the bonus or skill-based bonus game is complete, the player's upgrades reset (e.g., all upgrade symbols in the upgrade symbol meters are reset to zero) and must be collected again during the base game 400, which may be a new base game or a return to the previously played base game 400 prior to entering the skill-based game 425.

Figure 5:
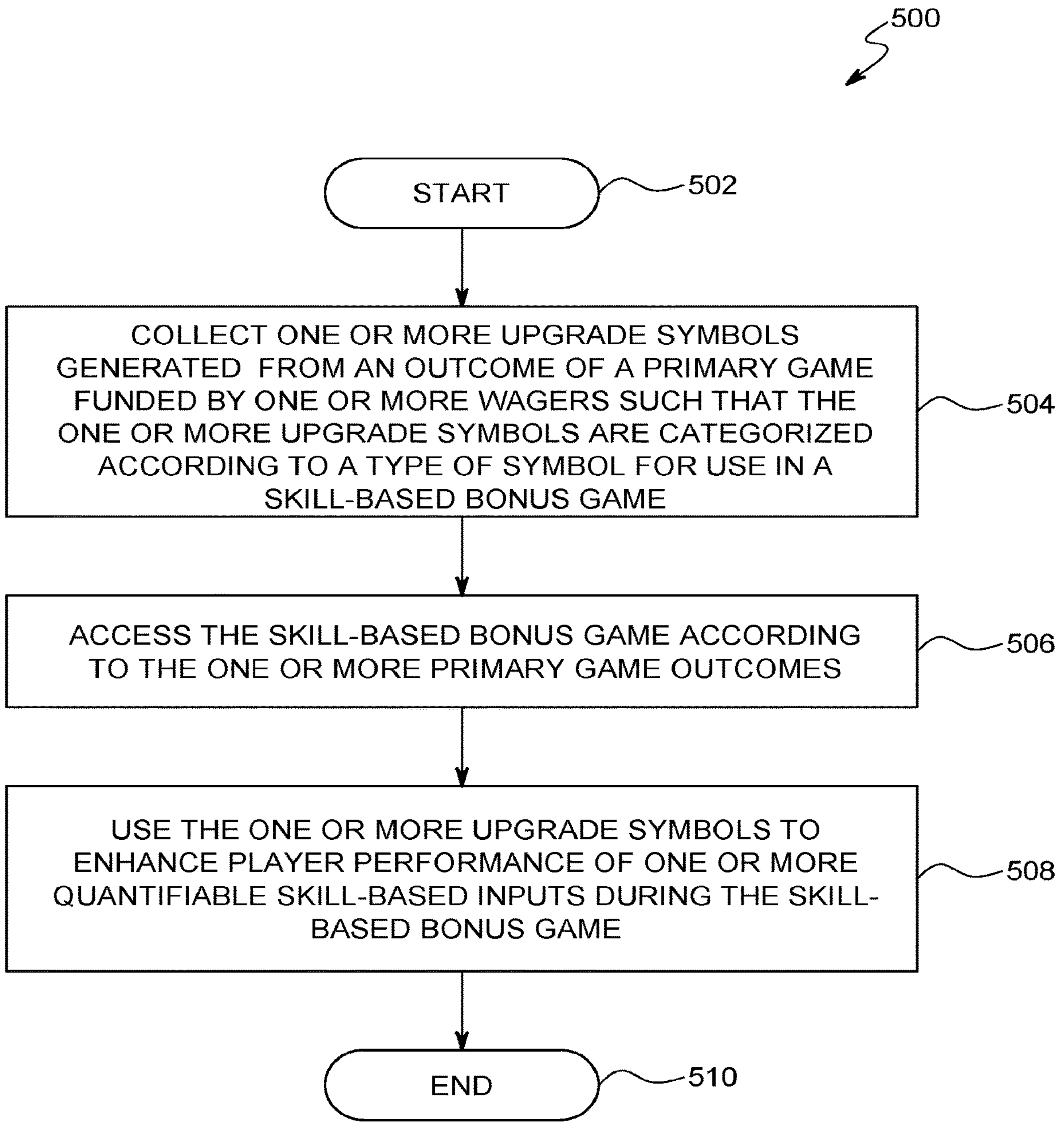
FIG. 5 is a flowchart illustrating an exemplary method for bonus symbol collection for skill-based games in a gaming system.

Turning now to FIG. 5, a method 500 for bonus symbol collection for skill-based games in a gaming system is depicted. The method 500 may be implemented on or in association with any of the environments of FIGS. 1-3B as discussed previously. The method 500 begins at block 502. An EGM (e.g., EGM 210) may collect one or more upgrade symbols generated from an outcome of a primary game funded by one or more wagers such that the one or more upgrade symbols are categorized according to a type of symbol for use in a skill-based bonus game, as in block 504. The skill-based bonus game may be accessed according to the one or more primary game outcomes, as in block 506. One or more upgrade symbols may be used to enhance player performance of one or more quantifiable skill-based inputs during the skill-based bonus game, as in block 508. The method 500 ends at block 510.

Figure 6:
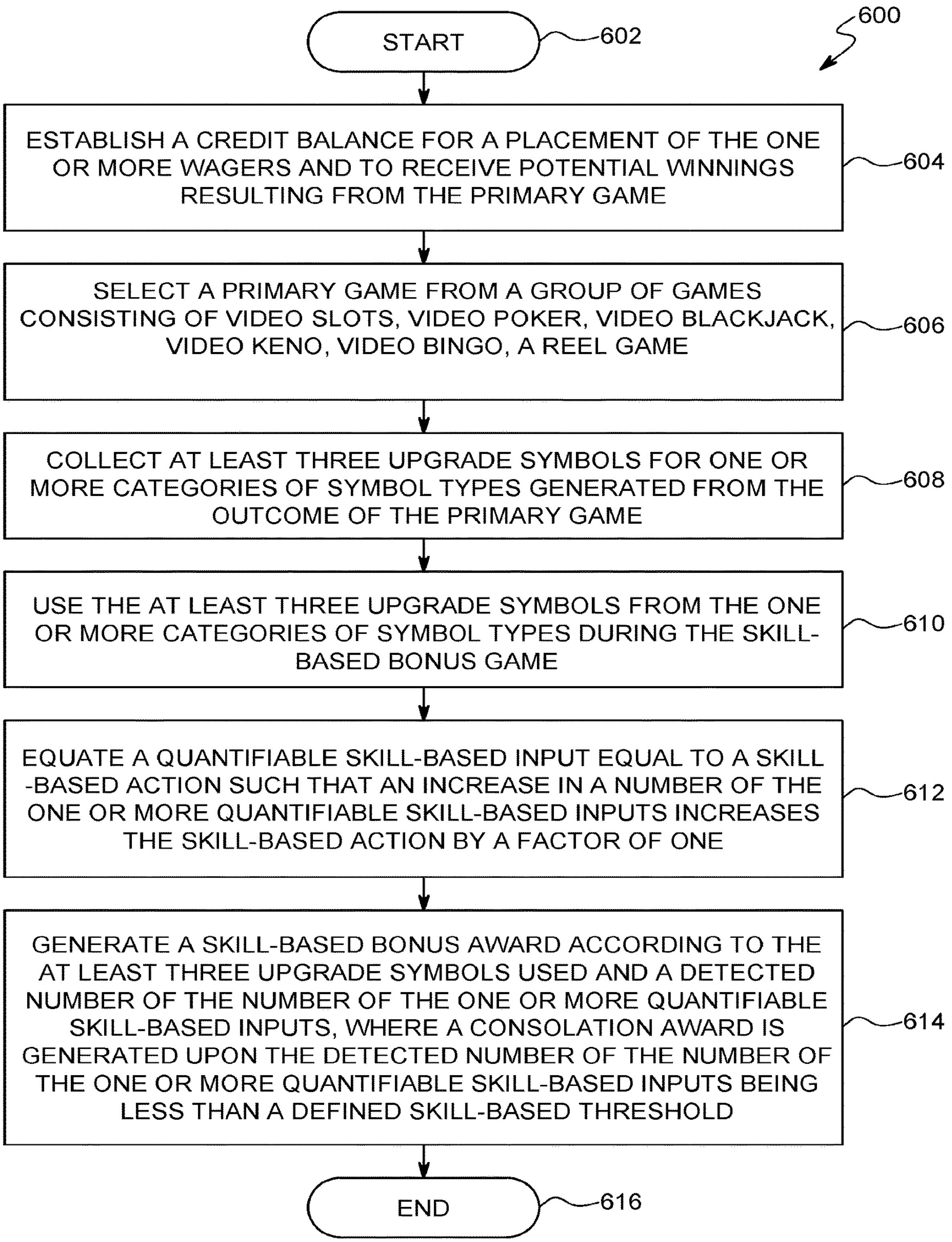
FIG. 6 is a flowchart illustrating an additional exemplary method for bonus symbol collection for skill-based games in a gaming system.

Turning now to FIG. 6, an additional method 600 for bonus symbol collection for skill-based games in a gaming system is depicted. The method 600 may also be implemented on or in association with any of the environments of FIGS. 1-3B as discussed previously. The method 600 begins in block 602. A credit balance may be established for a placement of the one or more wagers and to receive potential winnings resulting from the primary game, as in block 604. A primary game (e.g., a base game such as base game 400) may be selected from a group of games consisting of video slots, video poker, video blackjack, video keno, video bingo, a reel game, or a combination thereof, as in block 606. A predetermined number (e.g., at least three) upgrade symbols may be collected for one or more categories of symbol types generated from the outcome of the primary game for unlocking a skill-based game (e.g., skill-based game 425), as in block 608. The at least three upgrade symbols may be used from the one or more categories of symbol types during the skill-based bonus game, as in block 610. A quantifiable skill-based input may be equated (e.g., set) to a skill-based action such that an increase in a number of the one or more quantifiable skill-based inputs increases the skill-based action by a factor of one, as in block 612. A skill-based bonus award may be generated according to the at least three bonus symbols used and a detected number of the number of the one or more quantifiable skill-based inputs, wherein a consolation award is generated upon the detected number of the number of the one or more quantifiable skill-based inputs being less than a defined skill-based threshold, as in block 614. The method 600 ends in block 616.

In one aspect, in conjunction with and/or as part of at least one block of FIGS. 5 and 6, the operations of the methods 500 and 600 may include each of the following. In one aspect, the operations of methods 500 and 600 may include using one or more devices associated with the EGM 210 for the player to use for playing the skill-based game 425. The operations of 500 and 600 may include transferring at least a portion of control to mobile device 131 associated with the EGM 210 such that the transfer enables the player to perform the one or more quantifiable skill-based inputs on the mobile device 131, which inputs are ultimately quantified by the EGM 210. The one or more quantifiable skill-based inputs are selected from at least one quantifiable input of a mental skill, at least one quantifiable input of a physical skill, or a combination thereof. A skill-based bonus award may be generated according to the one or more quantifiable skill-based inputs. A skill-based bonus award may be generated according to a number of the one or more upgrade symbols used and a detected number of the one or more quantifiable skill-based inputs using one or more devices (e.g., the mobile device 131) associated with the EGM 210. A consolation award may be generated for a skill-based performance during the skill-based game 425 which does not meet a defined threshold.

The operations of 500 and 600 may include transferring the one or more upgrade symbols generated from the outcome of the base game 400 displayed in a first section on the EGM 210 to an upgrade symbol meter displayed on a second section of the EGM 210. The one or more bonus symbols may be displayed in an upgrade symbol meter in the second section while the player continues to play the base game 400 (or "primary game").

In one aspect, the PED or mobile device 131 may be a biometric sensor, smartphone, an electronic tablet, a computer, a cellular phone, a portable phone, a media player, a personal data organizer, a handheld game platform, a tablet computer, a notebook computer, a financial transaction device, a game controller, a joystick, and/or any combination of such devices.

As will be appreciated by one skilled in the art, aspects of the present disclosure may be embodied as an apparatus, system, method or a computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

Aspects of the present disclosure have been described above with reference to flowchart illustrations and/or block diagrams of methods, apparatus, and systems according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks.

These computer program instructions may also be stored in a computer readable storage medium that may direct a computer, other programmable data processing apparatus, or other devices to function in a particular manner, such that the instructions stored in the computer readable storage medium produce an article of manufacture including instructions which implement the function/act specified in the flowcharts and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowcharts and/or block diagram block or blocks.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RANI), a read-only memory (ROJVI), an erasable programmable read only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

The flowcharts and block diagrams in the above figures illustrate the architecture, functionality, and operation of possible implementations of systems, methods and computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

What is claimed is:

1. A method of operating an electronic gaming machine (EGM) in a gaming system, by at least one processor, comprising:

collecting an upgrade symbol generated from an outcome of a primary game of chance funded by a wager, the upgrade symbol categorized according to a type of symbol for use in a skill-based bonus game, wherein the primary game of chance produces a plurality of different upgrade symbols that provide a different additional skill-based feature in the skill-based bonus game;

determining a type of skill-based feature associated with the upgrade symbol collected from the primary game of chance, wherein the type of skill-based feature associated with the upgrade symbol enhances player control of a quantifiable skill-based input;

accessing and executing the skill-based bonus game according to the outcome of the primary game of chance; and using gameplay functionality associated with the upgrade symbol to enhance the player control of the quantifiable skill-based input during the skill-based bonus game by enabling an additional skill-based feature in the skill-based game not otherwise available to the player in the skill-based game without using the upgrade symbol, wherein the additional skill-based feature corresponds to the type of skill-based feature associated with the upgrade symbol collected from the primary game of chance.

2. The method of claim 1, further comprising detecting the quantifiable skill-based input by a player using an input device associated with the EGM during play of the skill-based bonus game.

3. The method of claim 2, further comprising transferring at least a portion of control during the skill-based bonus game to the input device associated with the EGM to detect the input of the quantifiable skill-based input, wherein the quantifiable skill-based input comprises at least one of a quantifiable input of a mental skill and a quantifiable input of a physical skill.

4. The method of claim 1, further comprising generating a skill-based bonus award according to the player performance associated with the quantifiable skill-based input.

5. The method of claim 1, further comprising generating a skill-based bonus award according to a number of the upgrade symbols used and a detected number of quantifiable skill-based inputs received during the skill-based bonus game.

6. The method of claim 1, further comprising providing a consolation award when the player performance during the skill-based bonus game is determined not to meet a defined threshold.

7. The method of claim 1, further comprising:

transferring the upgrade symbol generated from the outcome of the primary game of chance from the primary game of chance and displayed in a first section on a graphical user interface (GUI) of the EGM to an upgrade symbol meter displayed on a second section on the GUI of the EGM; and displaying the upgrade symbol in the upgrade symbol meter in the second section on the GUI of the EGM while the player continues to play the primary game of chance.

8. The method of claim 1, further comprising:

establishing a credit balance for a placement of the wager to receive potential winnings resulting from the outcome of the primary game of chance;

selecting the primary game of chance from at least one of video slots, video poker, video blackjack, video keno, video bingo, and a reel game;

collecting three of the upgrade symbols for a category of symbol types generated from the outcome of the primary game of chance;

using the gameplay functionality associated with the three of the upgrade symbols from the category of symbol types during the skill-based bonus game; and equating a quantifiable skill-based input equal to a skill-based action such that an increase in a number of quantifiable skill-based inputs increases the skill-based action by a factor of one.

9. An electronic gaming machine (EGM) comprising:

a display;

a communication module;

a memory device; and a processor executing instructions stored in the memory device, wherein the instructions, when executed, cause the processor to:

collect an upgrade symbol generated from an outcome of a primary game of chance funded by a wager such that the upgrade symbol is categorized according to a type of symbol for use in a skill-based bonus game, wherein the primary game of chance produces a plurality of different upgrade symbols that provide a different additional skill-based feature in the skill-based bonus game;

determine a type of skill-based feature associated with the upgrade symbol collected from the primary game of chance, wherein the type of skill-based feature associated with the upgrade symbol enhances player control of a quantifiable skill-based input;

access and execute the skill-based bonus game according to the outcome of the primary game of chance; and use gameplay functionality associated with the upgrade symbol to enhance the player control of the quantifiable skill-based input during the skill-based bonus game by enabling protection from opposing forces in the skill-based bonus game, wherein the additional skill-based feature corresponds to the type of skill-based feature associated with the upgrade symbol collected from the primary game of chance.

10. The EGM of claim 9, wherein the upgrade symbol is associated with a category of a first type of defensive symbols and another upgrade symbol is associated with a category of a second type offensive symbols.

11. The EGM of claim 10, wherein when executed by the processor, the instructions cause the processor to transfer at least a portion of control during the skill-based bonus game to an input device associated with the EGM to detect the input of the quantifiable skill-based input, wherein the quantifiable skill-based input comprises at least one of a quantifiable input of a mental skill and a quantifiable input of a physical skill.

12. The EGM of claim 9, wherein when executed by the processor, the instructions cause the processor to perform at least one of:

generate a skill-based bonus award according to the player performance associated with the quantifiable skill-based input;

generate a skill-based bonus award according to a number of the upgrade symbol used and a detected number of quantifiable skill-based inputs received during the skill-based bonus game; and provide a consolation award when the player performance during the skill-based bonus game is determined not to meet a defined threshold.

13. The EGM of claim 9, wherein when executed by the processor, the instructions cause the processor to:

transfer the upgrade symbol generated from the outcome of the primary game of chance from the primary game of chance and displayed in a first section on a graphical user interface (GUI) of the EGM to an upgrade symbol meter displayed on a second section on the GUI of the EGM; and display the upgrade symbol in the upgrade symbol meter in the second section on the GUI of the EGM while the player continues to play the primary game of chance.

14. The EGM of claim 9, wherein when executed by the processor, the instructions cause the processor to:

Establish a credit balance for a placement of the wager to receive potential winnings resulting from the outcome of the primary game of chance;

select the primary game from at least one of video slots, video poker, video blackjack, video keno, video bingo, and a reel game;

collect three of the upgrade symbols for a category of symbol types generated from the outcome of the primary game of chance;

use the gameplay functionality associated with the three of the upgrade symbols from the category of symbol types during the skill-based bonus game; and equate a quantifiable skill-based input equal to a skill-based action such that an increase in a number of quantifiable skill-based inputs increases the skill-based action by a factor of one.

15. A gaming system comprising:

a server processor; and a server memory that stores executable instructions which, when executed by the server processor, cause the server processor to:

collect an upgrade symbol generated from an outcome of a primary game of chance funded by a wager such that the upgrade symbol is categorized according to a type of symbol for use in a skill-based bonus game, wherein the primary game of chance produces a plurality of different upgrade symbols that provide a different additional skill-based feature in the skill-based bonus game;

determine a type of skill-based feature associated with the upgrade symbol collected from the primary game of chance, wherein the type of skill-based feature associated with the upgrade symbol enhances player control of a quantifiable skill-based input;

access and execute the skill-based bonus game according to the outcome of the primary game of chance;

use gameplay functionality associated with the upgrade symbol to enhance player control of the quantifiable skill-based input during the skill-based bonus game by enabling an additional skill-based feature in the skill-based game not otherwise available to the player in the skill-based game without using the upgrade symbol, wherein the additional skill-based feature corresponds to the type of skill-based feature associated with the upgrade symbol collected from the primary game of chance;

detect a number of the quantifiable skill-based inputs received during the skill-based bonus game; and determine an award based, at least in part, on the number of the quantifiable skill-based inputs.

16. The gaming system of claim 15, wherein when executed by the server processor, the executable instructions cause the server processor to detect the quantifiable skill-based inputs by a player using an input device associated with the EGM during play of the skill-based bonus game.

17. The gaming system of claim 16, wherein when executed by the server processor, the executable instructions cause the server processor to transfer at least a portion of control during the skill-based bonus game to the input device associated with the EGM to detect the input of the quantifiable skill-based inputs, wherein the quantifiable skill-based inputs comprise at least one of a quantifiable input of a mental skill and a quantifiable input of a physical skill.

18. The gaming system of claim 15, wherein the award is also determined based on at least one of the player performance associated with the quantifiable skill-based inputs and a number of the upgrade symbol used.

19. The gaming system of claim 15, wherein when executed by the server processor, the executable instructions cause the server processor to:

transfer the upgrade symbol generated from the outcome of the primary game of chance from the primary game of chance and displayed in a first section on a graphical user interface (GUI) of the EGM to an upgrade symbol meter displayed on a second section on the GUI of the EGM; and display the upgrade symbol in the upgrade symbol meter in the second section on the GUI of the EGM while the player continues to play the primary game of chance.

20. The gaming system of claim 15, wherein when executed by the server processor, the executable instructions cause the server processor to:

establish a credit balance for a placement of the wager to receive potential winnings resulting from the outcome of the primary game of chance;

select the primary game of chance from at least one of video slots, video poker, video blackjack, video keno, video bingo, and a reel game;

collect three of the upgrade symbols for a category of symbol types generated from the outcome of the primary game of chance;

use the gameplay functionality associated with the three of the upgrade symbols from the category of symbol types during the skill-based bonus game; and equate a quantifiable skill-based input equal to a skill-based action such that an increase in a number of quantifiable skill-based inputs increases the skill-based action by a factor of one.

* * * * *